(12) United States Patent
Gardner et al.

(10) Patent No.: US 10,726,397 B1
(45) Date of Patent: Jul. 28, 2020

(54) DYNAMIC EVENT SCHEDULING

(71) Applicant: United Services Automobile Association (USAA), San Antonio, TX (US)

(72) Inventors: Michael Gardner, Powder Springs, GA (US); David Hicken, Lindon, UT (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/584,304

(22) Filed: Sep. 26, 2019

Related U.S. Application Data

(63) Continuation of application No. 15/625,834, filed on Jun. 16, 2017, now Pat. No. 10,467,599.

(Continued)

(51) Int. Cl.
| | | |
|---|---|---|
| *G06Q 10/00* | (2012.01) | |
| *G06Q 10/10* | (2012.01) | |
| *G06Q 50/20* | (2012.01) | |
| *H04L 12/18* | (2006.01) | |
| *G06F 40/103* | (2020.01) | |
| *G06F 40/151* | (2020.01) | |
| *G06F 3/0482* | (2013.01) | |
| *G06F 3/0486* | (2013.01) | |

(52) U.S. Cl.
CPC ....... *G06Q 10/1095* (2013.01); *G06F 40/103* (2020.01); *G06F 40/151* (2020.01); *G06Q 10/1093* (2013.01); *G06Q 50/2057* (2013.01); *H04L 12/1818* (2013.01); *G06F 3/0482* (2013.01); *G06F 3/0486* (2013.01)

(58) Field of Classification Search
None
See application file for complete search history.

(56) References Cited

U.S. PATENT DOCUMENTS 4,626,836 A * 12/1986 Curtis ............... G06Q 10/109
283/67
5,070,470 A * 12/1991 Scully ............... G06Q 10/109
708/112

(Continued)

OTHER PUBLICATIONS

U.S. Appl. No. 15/625,739, filed Jun. 16, 2017, Gardner et al.

(Continued)

*Primary Examiner* — Gurkanwaljit Singh
(74) *Attorney, Agent, or Firm* — Fish & Richardson P.C.

(57) ABSTRACT

Implementations provide a calendar application for dynamic scheduling and adjustment of events, such as sequential training events. The calendar application is used to specify events that are to occur within a schedule of events, an order in which the events are to occur, and a duration for each event. The calendar application is also used to specify available time periods in which the events may be scheduled. Based on the specified events and available time periods, the events are scheduled into available time periods to generate a calendar, a schedule of the events that preserves the specified order of events. On detecting a change in the inputs, such as a change in the specified events and/or available time periods, the calendar may be automatically updated (in real time with respect to the change) to accommodate the change, while preserving the order and duration of events.

17 Claims, 17 Drawing Sheets

Related U.S. Application Data

(60) Provisional application No. 62/351,608, filed on Jun. 17, 2016.

(56) References Cited

U.S. PATENT DOCUMENTS

| | | | | |
|---|---|---|---|---|
| 5,943,652 | A * | 8/1999 | Sisley | G06Q 10/06 705/7.25 |
| 6,016,478 | A * | 1/2000 | Zhang | G06Q 10/06314 705/7.19 |
| 6,073,110 | A * | 6/2000 | Rhodes | G06Q 10/06 705/7.12 |
| 6,085,166 | A * | 7/2000 | Beckhardt | G06Q 10/109 705/7.18 |
| 6,101,480 | A * | 8/2000 | Conmy | G06Q 10/109 705/7.18 |
| 6,266,295 | B1 * | 7/2001 | Parker | G06Q 10/109 368/28 |
| 6,388,772 | B1 * | 5/2002 | Williams | G06Q 10/109 358/400 |
| 6,560,655 | B1 * | 5/2003 | Grambihler | H04L 67/10 709/202 |
| 6,820,096 | B1 * | 11/2004 | Kanevsky | G06Q 10/109 |
| 6,988,128 | B1 * | 1/2006 | Alexander | G06Q 10/109 709/206 |
| 6,999,731 | B2 * | 2/2006 | Cronin | H04M 1/7253 340/7.57 |
| 6,999,993 | B1 * | 2/2006 | Shah | H04L 51/14 709/207 |
| 7,082,402 | B2 * | 7/2006 | Conmy | G06F 17/211 705/7.19 |
| 7,188,073 | B1 * | 3/2007 | Tam | G06Q 10/02 705/7.16 |
| 7,224,963 | B2 * | 5/2007 | Anderson | H04M 1/72525 340/539.13 |
| 7,369,750 | B2 * | 5/2008 | Cheng | H04N 5/782 348/E7.054 |
| 7,395,221 | B2 * | 7/2008 | Doss | G06Q 10/06314 705/7.19 |
| 7,584,278 | B2 * | 9/2009 | Rajarajan | G06F 9/5055 709/226 |
| 7,747,458 | B2 * | 6/2010 | Lyle | G06Q 10/063116 705/7.19 |
| 7,747,459 | B2 * | 6/2010 | Doss | G06Q 10/06314 705/7.19 |
| 7,752,066 | B2 * | 7/2010 | Doss | G06Q 10/06314 705/7.19 |
| 7,818,198 | B2 * | 10/2010 | Masselle | G06Q 10/1093 705/7.18 |
| 8,005,703 | B2 * | 8/2011 | Chakra | G06Q 10/06311 705/7.19 |
| 8,874,456 | B2 * | 10/2014 | Lakritz | G06Q 10/06 705/7.12 |
| 9,779,063 | B1 | 10/2017 | Dykema | |
| 2001/0014866 | A1 * | 8/2001 | Conmy | G06F 17/211 705/7.19 |
| 2001/0014867 | A1 * | 8/2001 | Conmy | G06F 17/211 705/7.18 |
| 2001/0044903 | A1 * | 11/2001 | Yamamoto | H04L 63/02 726/26 |
| 2001/0049638 | A1 * | 12/2001 | Satoh | G06Q 30/016 705/26.44 |
| 2002/0016729 | A1 * | 2/2002 | Breitenbach | G06Q 10/06 707/802 |
| 2002/0029161 | A1 * | 3/2002 | Brodersen | G06Q 10/06 705/7.14 |
| 2002/0044149 | A1 * | 4/2002 | McCarthy | H04M 1/72563 345/581 |
| 2002/0131565 | A1 * | 9/2002 | Scheuring | G06Q 10/109 379/88.19 |
| 2002/0138326 | A1 * | 9/2002 | Parker | G06Q 10/109 705/50 |
| 2003/0004773 | A1 * | 1/2003 | Clark | G06Q 10/109 705/7.19 |
| 2003/0028399 | A1 * | 2/2003 | Davis | G06F 19/3418 705/2 |
| 2003/0030751 | A1 * | 2/2003 | Lupulescu | H04N 5/44543 348/552 |
| 2003/0046304 | A1 * | 3/2003 | Peskin | G06Q 10/109 |
| 2003/0097561 | A1 * | 5/2003 | Wheeler | G06Q 20/02 713/168 |
| 2003/0100336 | A1 * | 5/2003 | Cronin | H04M 1/7253 455/556.2 |
| 2003/0130882 | A1 * | 7/2003 | Shuttleworth | G06Q 10/109 709/204 |
| 2003/0149605 | A1 * | 8/2003 | Cragun | G06Q 10/06311 705/7.13 |
| 2003/0149606 | A1 * | 8/2003 | Cragun | G06Q 10/109 705/7.19 |
| 2003/0156706 | A1 | 8/2003 | Koehler et al. | |
| 2003/0171973 | A1 * | 9/2003 | Wilce | G06Q 10/109 705/500 |
| 2004/0031035 | A1 * | 2/2004 | Shiu | G06F 21/6209 718/102 |
| 2004/0078256 | A1 * | 4/2004 | Glitho | G06Q 10/109 709/207 |
| 2004/0093290 | A1 * | 5/2004 | Doss | G06Q 10/06314 705/35 |
| 2004/0122721 | A1 * | 6/2004 | Lasorsa | G06Q 10/06314 705/7.24 |
| 2004/0125142 | A1 * | 7/2004 | Mock | G06Q 10/109 715/765 |
| 2004/0139452 | A1 * | 7/2004 | Hope | G06F 9/542 719/318 |
| 2004/0162882 | A1 * | 8/2004 | Mora | G06Q 10/10 709/207 |
| 2004/0167877 | A1 * | 8/2004 | Thompson, III | G06Q 10/10 |
| 2004/0216168 | A1 * | 10/2004 | Trovato | H04N 7/163 725/135 |
| 2005/0020314 | A1 * | 1/2005 | Choi | H04M 1/72566 455/564 |
| 2005/0085272 | A1 * | 4/2005 | Anderson | H04M 1/72525 455/566 |
| 2005/0091399 | A1 * | 4/2005 | Candan | H04L 29/06027 709/238 |
| 2006/0041460 | A1 * | 2/2006 | Aaron | G06Q 10/1093 705/7.18 |
| 2006/0177034 | A1 * | 8/2006 | Reding | H04M 3/46 379/211.02 |
| 2007/0101284 | A1 * | 5/2007 | Shaw | G06Q 10/107 715/772 |
| 2007/0230282 | A1 * | 10/2007 | May | G04G 11/00 368/29 |
| 2007/0239506 | A1 * | 10/2007 | Jania | G06Q 10/109 705/7.18 |
| 2008/0059256 | A1 * | 3/2008 | Lynch | G06Q 10/063 705/7.24 |
| 2008/0091504 | A1 * | 4/2008 | Lyle | G06Q 10/063116 705/7.19 |
| 2008/0207263 | A1 * | 8/2008 | May | H04M 1/72566 455/556.2 |
| 2010/0017216 | A1 * | 1/2010 | Chakra | G06Q 10/06311 705/1.1 |
| 2011/0054976 | A1 * | 3/2011 | Adler | G06Q 10/109 705/7.18 |
| 2013/0282421 | A1 * | 10/2013 | Graff | G06Q 10/1093 705/7.18 |
| 2014/0181646 | A1 | 6/2014 | Rangwala et al. | |
| 2015/0199653 | A1 * | 7/2015 | Cili | G06Q 10/1095 705/7.19 |
| 2016/0275458 | A1 * | 9/2016 | Meushar | G06Q 10/109 |
| 2016/0357725 | A1 | 12/2016 | Homans et al. | |

OTHER PUBLICATIONS

U.S. Appl. No. 15/625,834, filed Jun. 16, 2017, Gardner et al.
USPTO Transaction History for U.S. Appl. No. 15/625,739, filed Jun. 16, 2017, 70 pages.

(56) References Cited

OTHER PUBLICATIONS

USPTO Transaction History for U.S. Appl. No. 15/625,834, filed Jun. 16, 2017, 222 pages.

* cited by examiner

DYNAMIC EVENT SCHEDULING

CROSS-REFERENCE TO RELATED APPLICATIONS

This application is a continuation application of and claims priority to U.S. application Ser. No. 15/625,834, filed on Jun. 16, 2017, which is related to, and claims priority to, U.S. Provisional Patent Application Ser. No. 62/351,608, titled "Smart Tool," which was filed on Jun. 17, 2016, the entirety of which are incorporated by reference into the present disclosure.

BACKGROUND

An organization may provide training opportunities to enable individuals within the organization to better perform in their particular roles. For example, a service providing organization may provide training opportunities to help customer service representatives improve the quality of service they are providing to customers or others who may interact with the organization. The training opportunities may include training materials that illustrate particular aspects of the service. The training opportunities may also include scheduled training classes or other events, and materials to guide self-paced study by the trainees.

SUMMARY

Implementations of the present disclosure are generally directed to event scheduling. More particularly, implementations of the present disclosure are directed to a calendar application that enables the dynamic scheduling and adjustment of events, such as sequential training events.

In general, implementations of innovative aspects of the subject matter described in this specification can be embodied in a method that includes the following actions: receiving event information describing events, an order in which the events are to be performed, and a respective duration of each of the events; receiving availability information indicating available time periods for scheduling the events; generating a calendar by scheduling each of the events in at least one respective available time period, in the order and according to the respective duration of each of the events, wherein the calendar is generated based on a set of rules that govern the scheduling of the events; providing the calendar for presentation through a user interface (UI); receiving an indication of a change in at least one of the scheduled events in the calendar; automatically regenerating the calendar according to the change by rescheduling at least one of the events in at least one respective available time period, in the order and according to the respective duration of each of the events, wherein the calendar is regenerated based on the set of rules; and providing the regenerated calendar for presentation through the UI.

These and other implementations can each optionally include one or more of the following innovative aspects: at least one of the events has a duration that is longer than one of the available time periods; the at least one of the events is divided for scheduling in multiple available time periods; the availability information further indicates at least one time period that is unavailable for scheduling the events; the set of rules indicate that an event is scheduled in a single available time period based on the duration of the event being less than a threshold duration; at least one of the events is scheduled into multiple available time periods; the at least one of the events is scheduled into multiple available time periods that are at a same time on multiple days; and/or the change includes one or more of an addition of at least one event, a deletion of at least one event, an unavailability of at least one time period for at least one event, and a change in the duration of at least one event.

Other implementations of any of the above aspects include corresponding methods, apparatus, and/or computer programs that are configured to perform the actions of the system. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. By provide a calendar application, guide application, and splash page application that updates a generated calendar, guide, and splash page respectively in real time with respect to changes made in the specification of the output calendar, guide, and/or splash page, implementations make more efficient use of processing capacity, storage space, memory, network capacity, and/or other computing resources that would be spent be traditional systems attempting to accommodate such changes.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
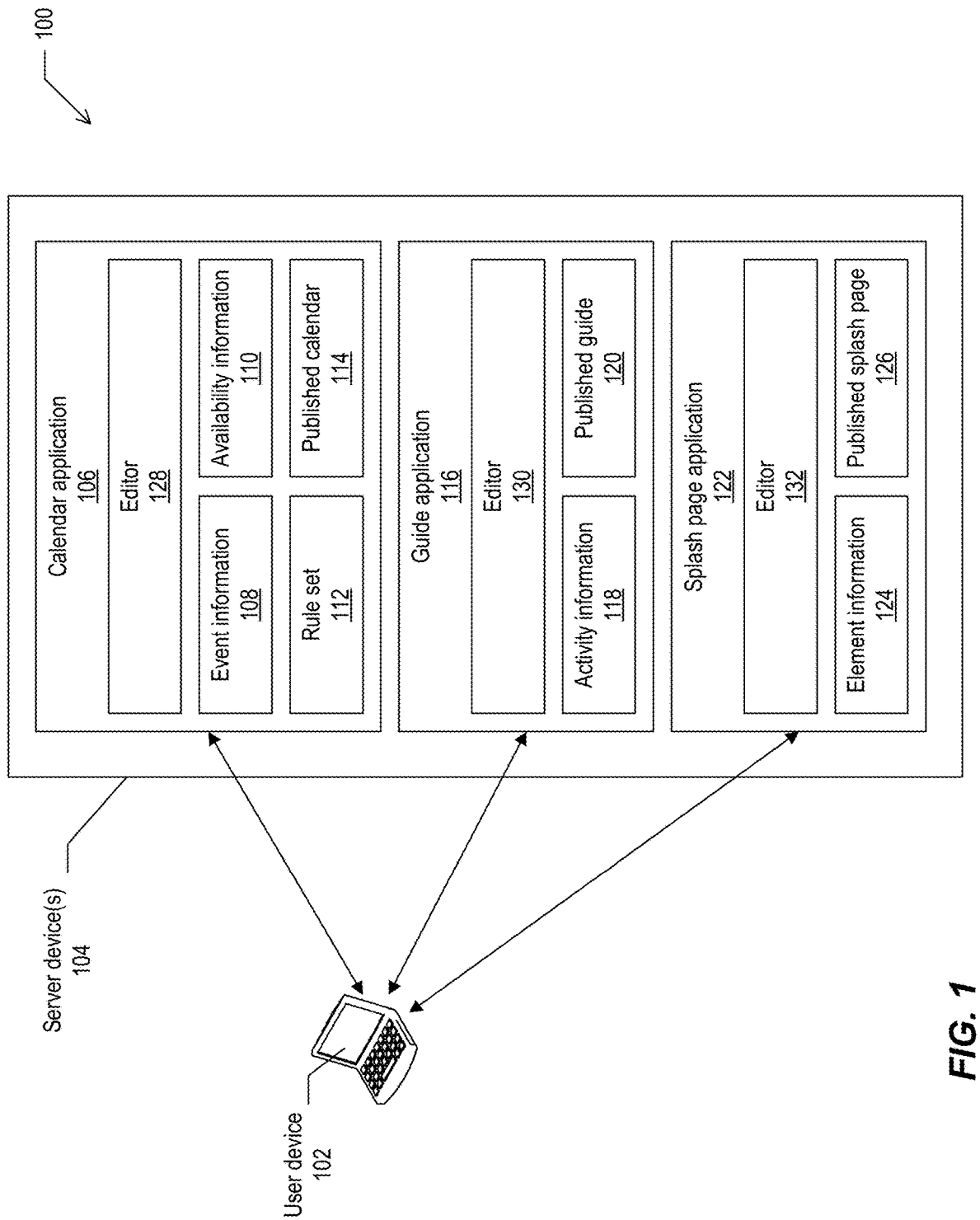
FIG. 1 depicts an example system for calendar, guide, and splash page applications, according to implementations of the present disclosure.

Implementations of the present disclosure are directed to devices, methods, and computer-readable media for a calendar application (also referred to as a smart calendar) that enables the dynamic scheduling and adjustment of events, such as sequential training events. A user can access a calendar application, and specify events that are to occur within a schedule of events. Events may also be described as activities. In some instances, the events include classes, seminars, group discussions, lectures, presentations, and/or other activities that are part of a training course, such as a course to train service representatives to provide customer service. Implementations also support other scenarios in which events are scheduled. The events may be sequential, in that the user may specify an order in which the events are to occur. For example, the events may include Class A, Class B, and Class C, and the user may indicate that Class B is to occur after Class A has completed, and Class C is to occur after Class B has completed. The user may also specify a duration for each of the events. The user can also access the calendar application to specify available time periods in which the events may be scheduled. For example, the user may indicate which days of the week are to be available, and/or which hours of those days are to be available. The user may specify gaps in the available time periods, or time periods that are unavailable for scheduling events. Accordingly, the available time periods may be discontinuous within a longer period of time that encompasses all the available time periods.

The calendar application may receive the specified events and available time periods as inputs and automatically schedule the events into the available time periods to generate a calendar, a schedule of the events that preserves the specified order of events. On detecting a change in the inputs, such as a change in the specified events and/or available time periods, the calendar may be automatically updated to accommodate the change, while preserving the specified order of events, the duration of the events, and/or other constraints on the scheduling (e.g., such as the rule set described below). Traditional calendars fail to adjust to situations where events are inserted, or removed from, a schedule of events. The calendar application described herein adjusts automatically, to provide a flexible scheduling tool that requires little or no manual input after the initial specification of inputs. In response to a change, the calendar application can automatically adjust the various activities to accommodate the change.

In some instances, the calendar application may schedule events to avoid, or at least minimize, gaps in time, to provide an optimal schedule that avoids down time that is unused. For events that are too long in duration to fit into a single available time period, the calendar application may automatically split such events across multiple time periods. Such multiple time periods may be in different days, and/or may be interrupted by a break, lunch hour, or other unavailable time period. In some instances, the calendar application may not accept inputs specifying particular time periods in which events are to be scheduled, and the calendar application may schedule events optimally within the available time periods to minimize gaps and provide for an overall schedule that completes as soon as possible, while preserving the specified event order.

The calendar application provides a user interface (UI) that enables a user to specify the events and available time periods. In some implementations, the UI enables a user to move (e.g., drag and drop) events within an ordered list of events, to specify the order in which the events are to occur. The UI may also enable the user to specify those events which are to occur once within the schedule, and events which occur multiple times within the schedule. For example, the UI may enable an event to be designated as a recurring event, such as a daily introduction, lunch hour, concluding session, and so forth, for each of the days specified in the available time periods. As the user moves activities within the schedule, e.g., re-orders the list of activities, the calendar may be automatically updated to account for the updated order. Similarly, the calendar may be automatically updated in response to the addition, deletion, duration change, and/or other changes to events. Changes to the calendar may preserve the order that was originally specified or, if the change is to the order itself, may apply the updated order of events to generate the schedule. Changes to the calendar may also be made to minimize or avoid gaps in time that are not explicitly indicated as unavailable time periods.

In some implementations, a rule set may also be applied when generating the calendar and/or when updating the calendar to accommodate changes. The rule set may provide constraints of the scheduling of events within the available time periods, in addition to those constraints that are imposed by the user-specified order of events, the duration of the events, and/or the available or unavailable time periods. For example, the rules may indicate that an event that can split across multiple available time periods if the event has a duration that is at least a minimum duration. For example, events with a duration of a half-hour or less may not be split across multiple available time periods when scheduling is performed. In some implementations, the splitting of an event may be performed automatically depending on where the calendar application is attempting to place the event in the schedule. For example, if the event ordering is such that a two-hour long event is to be scheduled, and the next available time period is an hour long, the event may be split such that the event occurs in the available hour-long time period as well as the subsequent available (at least) hour-long time period. In some implementations, the user may specify that particular events, or types of events may not be split, thus forcing the calendar application to identify an available time period long enough to accommodate the whole event. In some implementations, the rule set may indicate that an event must be able to be split across multiple available time periods if it is at least a minimum duration, regardless of whether the user indicates that the event is to be splittable. For example, the rule set may indicate that an event must be splittable if it is at least three hours long. If an activity is too short (or too long) to be split, the split option is disabled so the user may not select it. If an activity cannot be split, the user may move the mouse over the split selector to see the reason it cannot be split. The split option may remain disabled until the activity duration or other activity durations are changed such that the activity can be split. Other types of rules may also be applied.

In some implementations, the user can use the UI to specify that certain events are to be scheduled only within a certain set of available days and/or available time periods. For example, in a nine-day long schedule (e.g., nine available days for scheduling events), the user can specify that a particular event is to be scheduled only on one or more of day 2, day 7, day 8, or day 9. Activities can include Daily Activities and Calendar Activities. In some implementations, for a Calendar Activity, the UI may present no controls to let the user indicate when it may be scheduled, apart from specifying the activity order, and that such activities are scheduled to accommodate Daily Activities and days off (unavailable time periods). For a Daily Activity, the UI may enable the user to specify the start time, duration, and which days it occurs on (or does not occur on). A Daily Activity starts at its specified start time unless it conflicts with another Daily Activity, in which case the first (or shortest if they start at exactly the same time) activity is added to the calendar, then the second (the one that conflicts) is scheduled to start after the first Daily Activity is complete.

The UI can be used to identify different groups of individuals to participate in the events, such as trainees to participate in training session events. Different events can be specified to have different audiences. For example, two different groups of people can be designated to participate in two different events. Such events can be scheduled simultaneously, and/or in at least partly overlapping available time periods, if the different groups of people are mutually exclusive (e.g., with no shared members). A user of the calendar application may specify that different groups of individuals can access different views of the calendar. For example, events within the calendar may be viewable by individuals who are participating in the events, e.g., individuals who are in a group that is participating in the events. Thus, the calendar application may impose viewing permissions to enable individuals to view only those events that are relevant to them. The calendar application may provide an editor that enables a user to specify the inputs (e.g., events, available time periods, and so forth) to be used to generate the calendar. The calendar application may also provide the calendar itself that is viewable by various end-users, such as the individuals who are participating in the events.

In some implementations, the updating of the calendar is performed in real time with respect to detecting a change in at least one of the events and/or at least one of the available time periods. As used herein, a real time operation may describe an operation that is performed based on triggering event and without any intentional delay between the performed operation and the triggering event, taking into account the processing and/or communication limitations of the computing system(s) performing the operation and the time needed to initiate and/or perform the operation. The triggering event may be a received communication, a detection of a particular application state, another operation performed by the same or a different process, and so forth. A real time operation may also be described as a dynamic operation. Real time operations may include operations that are automatically executed in response to the triggering event without requiring human input or some other intervening action. In some examples, a real time operation may be performed within a same execution path as a process that detects and/or handles the triggering event. For example, the real time operation may be performed or initiated by code that executes as part of the handling of the event and/or in response to a message that is sent as part of the handling of the event. A real time operation may, in at least some instances, be performed synchronously with respect to the triggering event.

Implementations of the present disclosure are also directed to devices, methods, and computer-readable media for a guide application (also referred to as a smart guide). As with the calendar application described herein, in some implementations the guide application provides an ordered set of activities to be performed by an individual, but in a self-paced, self-conducted course of instruction that is not scheduled into particular time periods. The individual may proceed at their own pace, with their own schedule, to complete the activities in the guide. For example, the guide may provide a self-paced training session for one or more individuals. In some instances, the activities may be arranged into sections and, in some instances, sub-sections within the sections. The guide may impose a constraint on the individual, such that the individual may proceed to a next section only after all the activities in the previous section have been completed. In some implementations, each activity may correspond to a link, icon, or other selectable element in the UI of the guide application. Selecting an activity (e.g., clicking on a link or icon) may cause the UI to navigate to content, such as text to be read, a video to be watched, an interactive test or exercise to be performed, and so forth. Selecting the activity may cause the UI to change an indicator of the activity to indicate that it has been completed. For example, an uncompleted activity may be designed with a red X, whereas a completed activity may be designated with a green check-mark. In some implementations, uncompleted activities may be presented within any indication that they are not complete, apart from the absence of the indication of completion.

Completing all the activities in a first section, or sub-section, may cause the UI to display a subsequent section or sub-section that includes another set of activities to be completed. In this way, the guide may guide the individual in their progress through the activities, indicating the progress through various sections and/or sub-sections of activities until the individual has completed all the activities in the guide. The guide may include a splash page (e.g., an entry-level screen or top screen) that provides an overview of the individual's progress through the various activities, sections, and/or sub-sections. A completed section may collapse, such that the guide shows the top-view of the completed section. A section and/or sub-section may be designated complete if all the activities in the sub-section are designated complete. In some implementations, a sub-section or section is collapsed in the UI (to not show the included activities) when the sub-section or second is complete, and the subsequent section or sub-section in the order may expand to show a next set of tasks to be performed by the user. In some implementations, sections and/or sub-sections (whether complete or incomplete) can be collapsed or expanded by the user at any time, by clicking on the title of that section (e.g., the top bar). A section or sub-section may be indicated as unavailable (e.g., grayed out) if at least one previous (e.g., prerequisite) section is required and is not yet complete. A currently incomplete section or sub-section may show all the activities within the section or sub-section, each with an indication of complete or incomplete.

As with the calendar application, the guide application may provide an editor that enables a user to specify the inputs to be used to generate the guide, such as the various activities, their organized into sections or sub-sections, the order of the activities within the sections or sub-sections, the order of sections, and/or the order of sub-sections within sections. The guide application may use these inputs to generate the guide, which may be automatically updated based on detected changes to any of the inputs. The guide application may also provide the guide itself that is viewable by various end-users, such as the individuals who are participating in the guided course of self-paced activities.

In some implementations, the state of progress for each individual who is an end-user of the guide is saved on server(s) and/or user device(s) of the user. The state may be specific for a particular user, and may indicate which activities the user has completed and which activities are yet to be completed. In some implementations, the state is stored in a cookie format (or similar format) both on the user device, e.g., a client device. and on the server(s). The stored state information may be updated on the server(s) after or during the session by a user, such that the server-stored state is up-to-date. Accordingly, if the user logs into the guide application from various different user devices (e.g., desktop computer, laptop computer, smartphone, etc.), the user can resume the guide where they last left off regardless of whether they are continuing on a same device or on a different device. The state information may be stored with a timestamp (e.g., date and/or time) to ensure that the most up-to-date state information is used to restore a session if the user leaves the guide application and returns later.

The guide application includes an editor that provides a design view for the guide, and enables a user to specify the various activities and order of activities for one or more courses. As used herein, a course describes an ordered set of activities to be tracked through a guide. In some implementations, the editor includes a top panel that presents general information related to the guide application. The editor may include buttons or other controls that are useable to specify a theme, color(s), a title of a guide or course, course description, and so forth. The editor may also include controls that enable a user to specify activities by providing links to URLs for content for each activity. The editor may include controls that enable a user to specify an order of activities and/or arrange activities into sections or sub-sections, to any suitable number of levels in a hierarchy of sub-sections. In some implementations, the editor provides a drag-and-drop interface to let the user specify activity order and/or arrange activities into sections and/or sub-sections. The editor may also enable the user to specify a layout (e.g., arrangement) of the activities within the guide presented to end-users. For example, the user may specify a horizontal or vertical arrangement of activities. The editor may also include a control that allows the user to delete activities. For example, the editor may include a trash can icon into which activities are dragged and dropped to delete them.

In some implementations, a section can include any number of sub-sections. A sub-section can include any number of activities and/or any number of sub-sections. Sub-sections can, in this way, be nested to any appropriate number of levels within a hierarchy of sub-sections. Activities within a section, or sub-section, may have an order dependency that indicates the order in which activities are to be completed. In some implementations, the editor may show the ID (or identifier number) of activities through numbers that are displayed next to the activities links or icons. The user may click on an activity link or icon, then click on the ID numbers of other activity links or icons in order to indicate which other activities must be complete before this activity is enabled. The editor may provide a drag-and-drop interface for re-arranging activities. The guide application may automatically check for circular dependencies within a set of activities. For example, the guide application may present a warning, and/or prevent a user from specifying that Activity A depends on the completion of Activity B, which depends on the completion of Activity C, which depends on the completion of Activity A.

Implementations of the present disclosure are also directed to devices, methods, and computer-readable media for a splash page application (also referred to as a smart splash page). The splash page may be a web page that is viewable within a web browser or some other container configured to present web content. The splash page may include various elements such as text, images, graphics, and so forth, arranged according to user specifications made through the editor (e.g., design view) of the splash page application. The splash page may also include controls or other dynamic, selectable elements, such as links, icons, clickable graphics, and so forth. A click, gesture, or other manipulation of such controls may dynamically cause additional UI elements to be presented, such as pop-up dialogs, drop-down menus, and so forth. Some controls may enable navigation to other pages of content available at various network locations.

The splash page application may provide an editor that enables a user to specify the elements to be included in the splash page, and the arrangement of the elements in the splash page. The splash page application may use these inputs to generate the splash page, which may be automatically updated based on detected changes to any of the inputs. The splash page application may also provide the splash page itself that is viewable by various end-users. The splash page may be provided to end-users as a web page rendered as part of a web site, through a web browser or other container for presentation of web content. The splash page editor may be delivered as its own self-contained executable page, such as an HTML application (HTA). In some instances, the splash page is delivered as a component of course material for a training course.

The editor view of the splash page application may let the user (e.g., designer) specify the various links to include in the splash page, and their arrangement. The editor may also enable the user to specify images, background item(s), banners, and so forth. In some implementations, the input elements for the splash page may be stored in an extensible markup language (XML) file that describes the splash page. The editable data for the splash page may be presented in the editor view UI, which may enable the user to drag and drop content (e.g., links) into the UI to add link elements to the splash page.

In some implementations, the splash page application provides a different splash page for users of different roles within an organization, such as different splash pages for managers, instructors, and/or learners within a training environment. The editor may be used to specify different elements, such as different sets of links, that are to be made available in the different splash pages for the different roles. For example, at design time, the user may specify a particular element (e.g., a link) and indicate what role(s) that link is to be available for. In some implementations, the splash page application may provide different splash pages for different roles, and the different splash pages may be provided in different colors or themes to readily enable a user to discern the role associated with the splash page. In some implementations, the splash page may be accessible following an authentication of the end-user, such that the splash page presented to the authenticated end-user is appropriate for the end-user's role. The splash page application may generate a different splash page (e.g., manager.html, instructor.html, learner.html) for each different role. The editor can be used to define roles, add roles, remove roles, specify splash page characteristics for the various roles (e.g., color schemes). The editor may also include a link that lets the designer view the splash pages created for different roles.

In some implementations, one of more of the applications described herein (e.g., the calendar, guide, and splash page applications) may include editors as described above, and the editors may include a help icon that lets a user view help regarding the various features of the editor. The help that is presented on clicking the help icon may be context-dependent help. For example, the help content presented may depend on the particular section of the editor that the user is currently interacting with.

In some implementations, one or more of the applications described herein are provided as HTAs that execute on a user device. The HTAs may present content that is web content, but that does not execute through a web browser. The applications may also employ other types of containers for presenting web content, such as a WebView or iWebView object. In some implementations, one or more of the applications may be provided as a web application served by a web server and presented through a web browser on a user device.

FIG. 1 depicts an example system 100 for calendar, guide, and splash page applications, according to implementations of the present disclosure. As shown in the example of FIG. 1, a user device 102 can communicate over one or more networks with one or more server device(s) 104, and interact with a calendar application 106, a guide application 116, and/or a splash page application 122 executing on the server device(s) 104. The user device 102 may include any suitable type of computing device, including portable or mobile devices (e.g., tablet computer, smartphone, wearable computer, etc.) as well as less portable types of computing devices (e.g., desktop computer, laptop computer, etc.). The server device(s) 104 may also include any suitable number and type of computing device. In some implementations, the server device(s) 104 are distributing computing device(s) (e.g., cloud server(s)).

As described above, in some implementations the applications may be web applications that are provided through web server(s) executing on the server device(s) 104, and the user device 102 may execute a web browser to receive and present the applications. Alternatively, the applications may be native applications, HTAs, and/or other types of applications that executing on the user device 102 outside of a web browser, even though the applications may be described in HTML and/or other web programming language(s).

The calendar application 106 may provide an editor 128 (e.g., a design view) that enables a user to design the calendar 114. The editor 128 may enable the user to specify event information 108, including one or more events to be scheduled in the calendar. The editor 128 may also enable the user to specify availability information 110, including one or more time periods to be available for scheduling events. The calendar application 106 may employ a rule set 112, as described above, to schedule the events into the available time periods. The calendar application 106 may also include the published calendar 114. End-users (e.g., trainees, learners, instructors, managers, etc.) may interact with the published calendar 114 to keep track of the events that they are participating in. Examples of the calendar application 106, and its UI, are described further with reference to FIGS. 3A-3E.

The guide application 116 may provide an editor 130 (e.g., a design view) that enables a user to design the guide 120. The editor 130 may enable the user to specify activity information 118, including one or more activities, the activity order, sections of activities, sub-sections of activities, and/or other information. The guide application 116 may also include the published guide 120. End-users (e.g., trainees, learners, etc.) may interact with the published guide 120 to complete activities in the prescribed order, and to keep track of their progress in completing activities in a course that is described in the guide 120. Examples of the guide application 116, and its UI, are described further with reference to FIGS. 4A-4D.

The splash page application 122 may provide an editor 132 (e.g., a design view) that enables a user to design the splash page 126. The editor 132 may enable the user to specify element information 124, such as text elements, images, links, backgrounds, banners, and so forth to be included in the splash page 126. The editor 132 may also enable the user to specify role(s), including adding role(s), deleting role(s), and so forth. The editor 132 may also enable the user to specify those role(s) that are authorized to view particular element(s) in the splash page 126. The splash page application 122 may also include the published splash page 126. End-users (e.g., managers, instructors, learners, etc.) may interact with the published splash page 126 to navigate to various published content items (e.g., associated with training activities). Examples of the splash page application 122, and its UI, are described further with reference to FIGS. 5A-5E.

Figure 2:
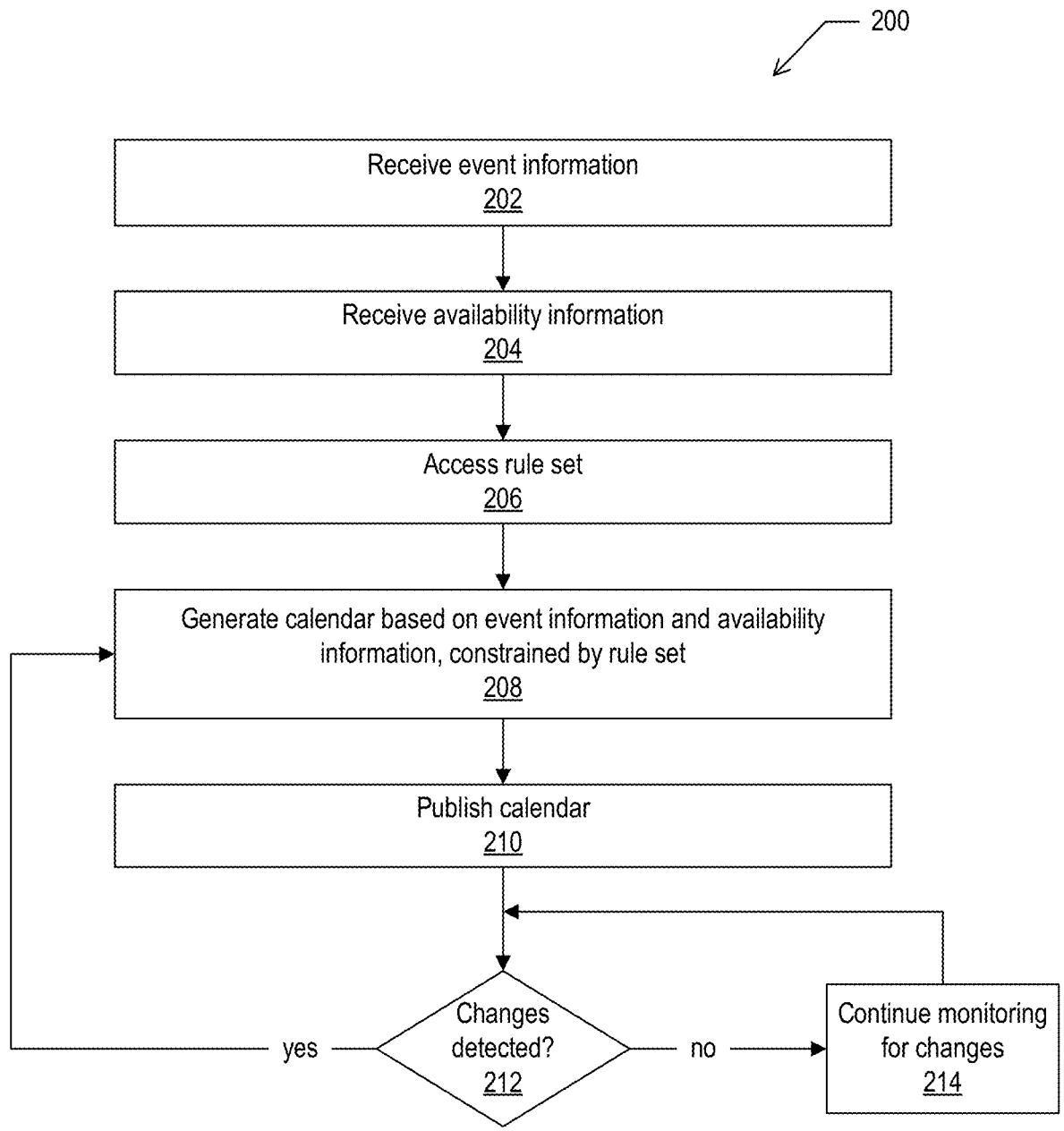
FIG. 2 depicts a flow diagram of an example process event scheduling in the calendar application, according to implementations of the present disclosure.

FIG. 2 depicts a flow diagram 200 of an example process for event scheduling, according to implementations of the present disclosure. Operations of the process can be performed by one or more of the calendar application 106 and/or other software module(s) executing on the server device(s) 104, the user device 102, or elsewhere.

Event information is received (202). The event information may be specified by a user through the editor of the calendar application, and/or retrieved from data storage. Available information is received (204). The availability information may also be specified by a user through the editor of the calendar application, and/or retrieved from data storage. In some implementations, a rule set is also accessed (206). The rule set may provide one or more rules that govern the scheduling of events, as described above.

The calendar is generated (e.g., automatically) (208) based on the event information and availability information, by scheduling events into the available time periods specified in the availability information, as constrained by the rule set. The calendar is then published (210) to be accessible by end-users. If the calendar application detects (212) changes (e.g., updates, additions, deletions) to the event information and/or availability information, the process may return to 208 and re-generate (e.g., update) the calendar to accommodate the changes. If no changes are detected, the calendar application may continue monitoring (214) for changes.

Figure 3A:
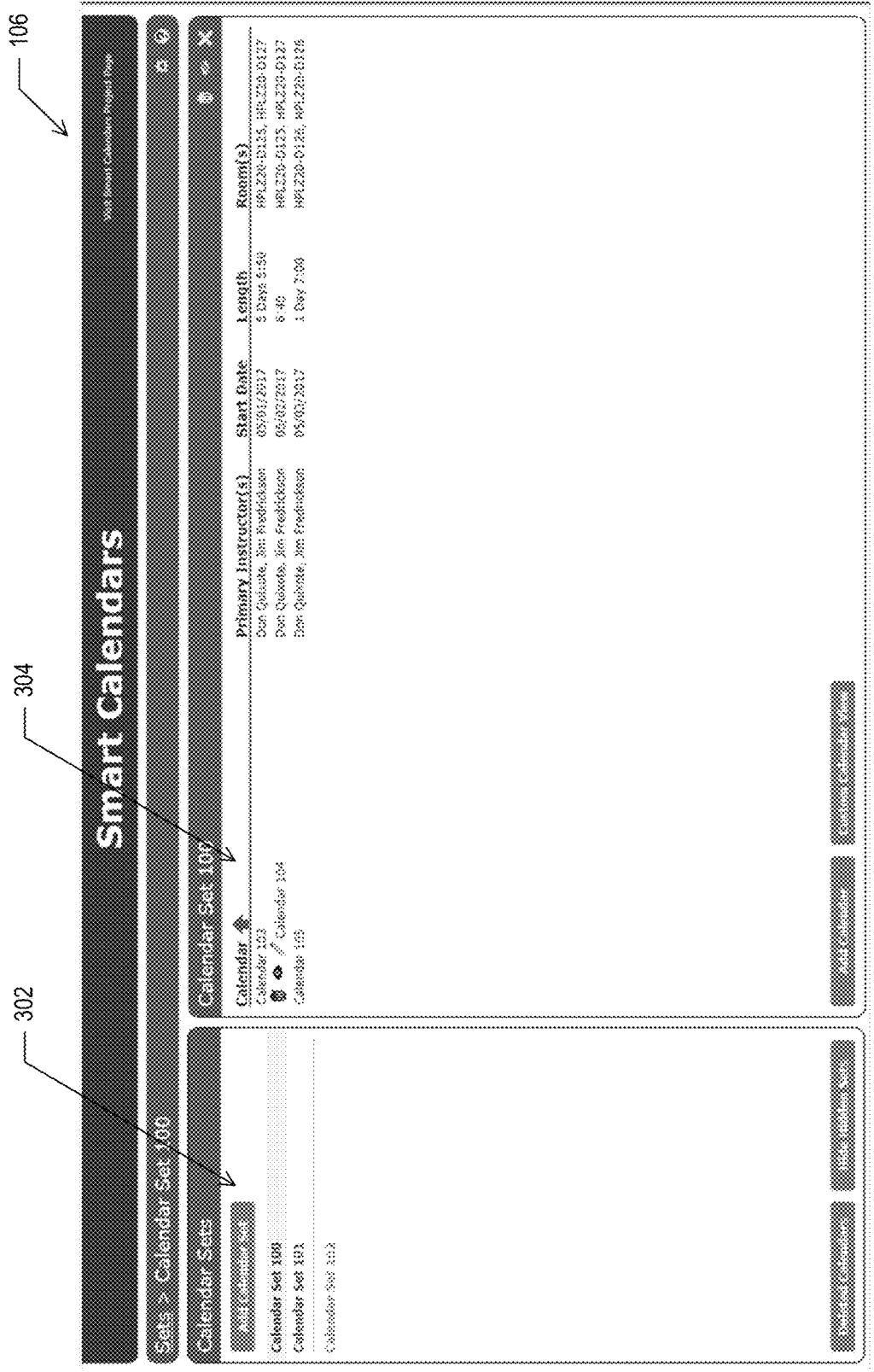
FIGS. 3A-3E depict example user interface screens for the calendar application, according to implementations of the present disclosure.

FIGS. 3A-3E depict example user interface screens for the calendar application 106, according to implementations of the present disclosure. FIGS. 3A-3D show examples of the editor used to specify and/or view calendar information. FIG. 3A shows an example screen that lists previously created calendar sets that each includes one or more calendars. Selecting a calendar set from the sets listed in pane 302 causes pane 304 to present details regarding the selected calendar set, such as associated instructor(s), start date, length (e.g., days, hours, and/or minutes), and locations where events can be held (e.g., rooms, buildings, cities, etc.). In this example, a user has selected Calendar Set 100, which includes Calendar 103, Calendar 104, and Calendar 105. Selecting one of the calendars may cause icons to appear for deleting the calendar (e.g., trash can), viewing the calendar (e.g., eye), and editing the calendar (e.g., pencil). The screen may include controls to add a new calendar set and/or new calendar.

Figure 3B:
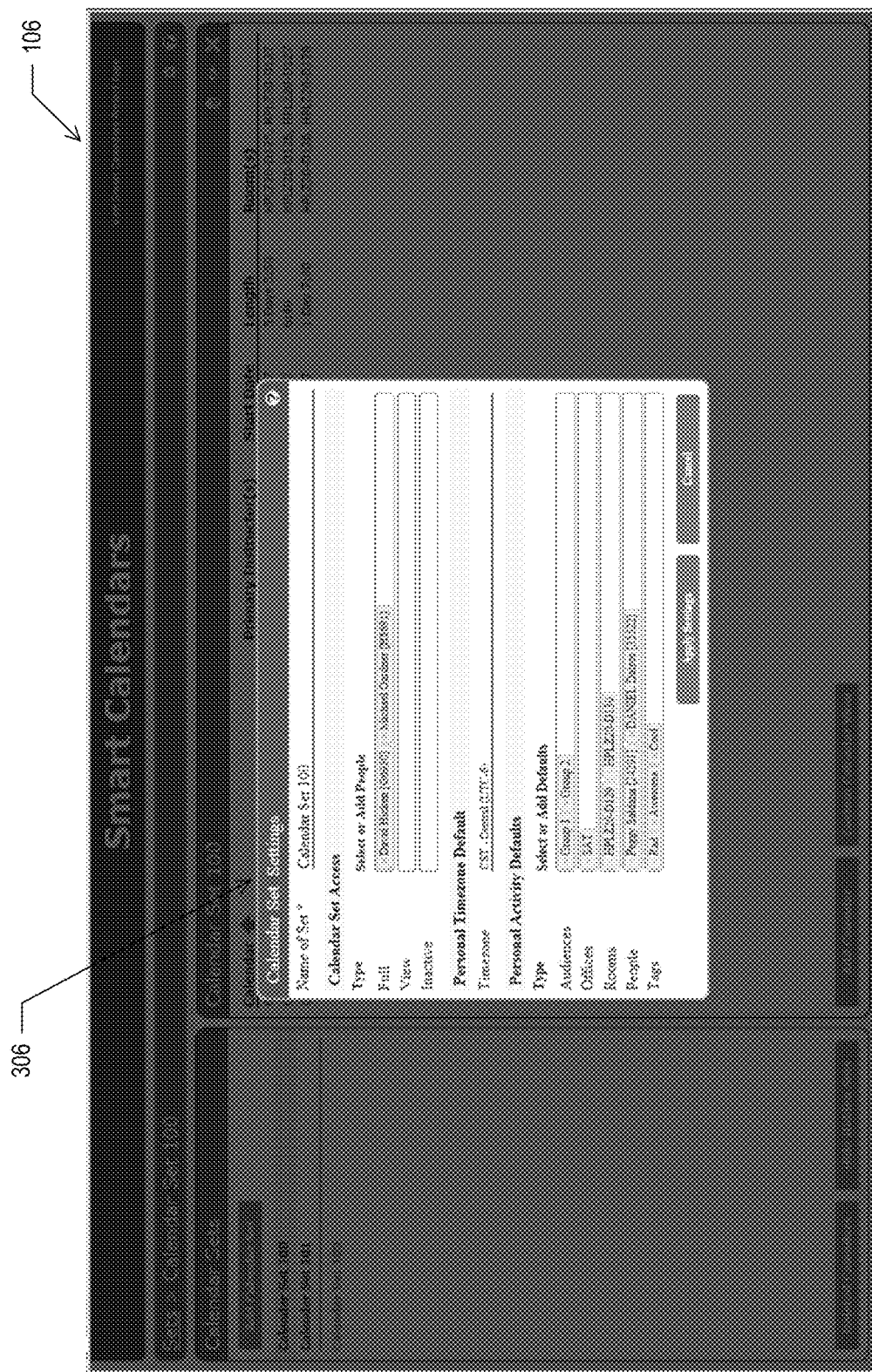

In the example of FIG. 3B, a dialog 306 is presented to enable a user to specify (or modify) settings regarding a Calendar Set. The dialog may enable a user to specify users to have permission to access a calendar set, such as full access (e.g., view and edit) or view-only access. The dialog may also enable a user to specify a time zone associated with the calendar set, audiences (e.g., groups) who can view the calendars in the calendar set, and locations, rooms, people, and/or tags associated with the calendar set.

Figure 3C:
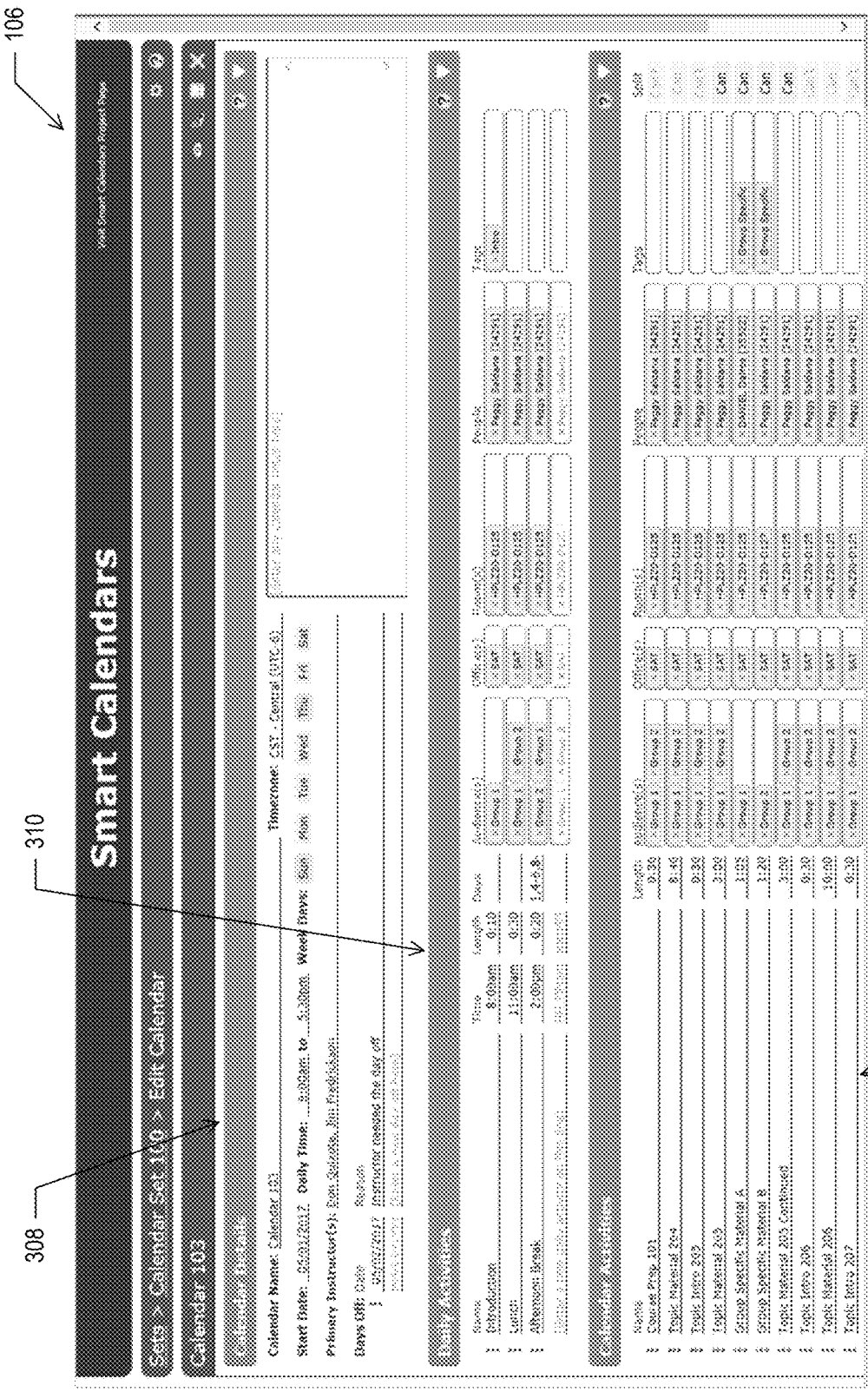

If the user indicates to edit or add a calendar, the UI may present a screen as shown in FIG. 3C. The screen may include a pane 308 to view and/or edit Calendar Details, such as calendar name, time zone, start date, daily time periods available for scheduling events, week days available for scheduling events, instructors, and/or days off (e.g., unavailable days). The screen may include a pane 310 to view and/or edit Daily Activities, including those events that are scheduled to occur every day in the course at a particular time. The screen may also include a pane 312 to view and/or edit Calendar Activities, including those events that are to occur one or more times (e.g., not every day) in the schedule. The Daily Activities list may indicate, for each event (e.g., activity), a name of the activity, a start time, duration (e.g., length), days when the event is to occur (default may be every day), audience(s) (e.g., attending group(s) of learners), locations (e.g., "Offices"), rooms, people associated (e.g., instructor), and/or tags. The Calendar Activities list may indicate, for each event (e.g., activity), a name of the activity, a duration, audience(s), locations, rooms, people associated, tags, and so forth. The Calendar Activities list may also indicate whether each activity can be split across multiple time periods.

Figure 3D:
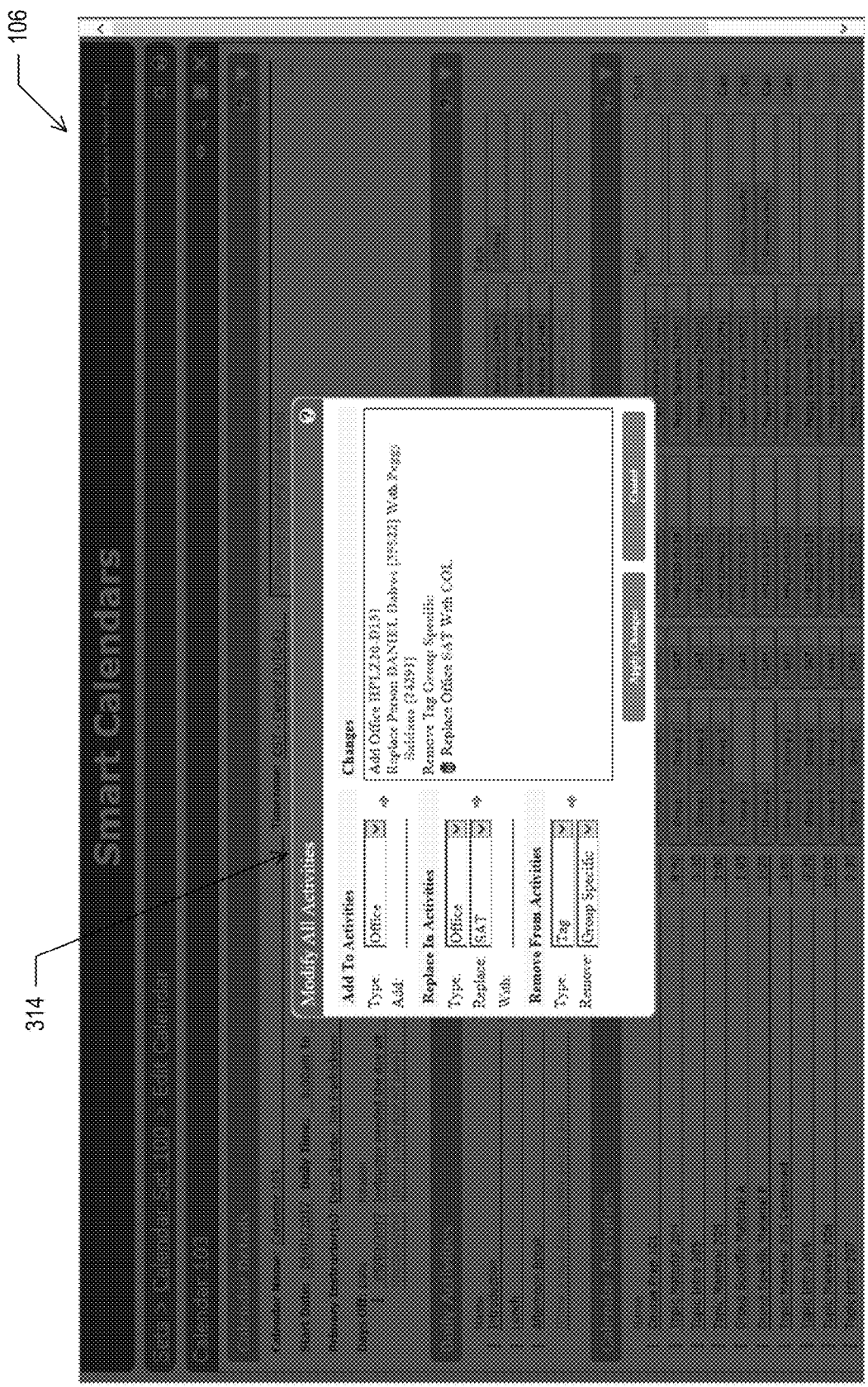

FIG. 3D shows an example dialog 314 that may be presented to enable a user to modify one or more activities (e.g., events) to be scheduled. The dialog 314 may allow a user to add or remove, or replace, attributes for various activities, attributes such as office, room, tags, people, and so forth. This expedites the process for changing scheduled events when there is a room change, personnel change (e.g., different instructor), and/or other changes to events.

Figure 3E:
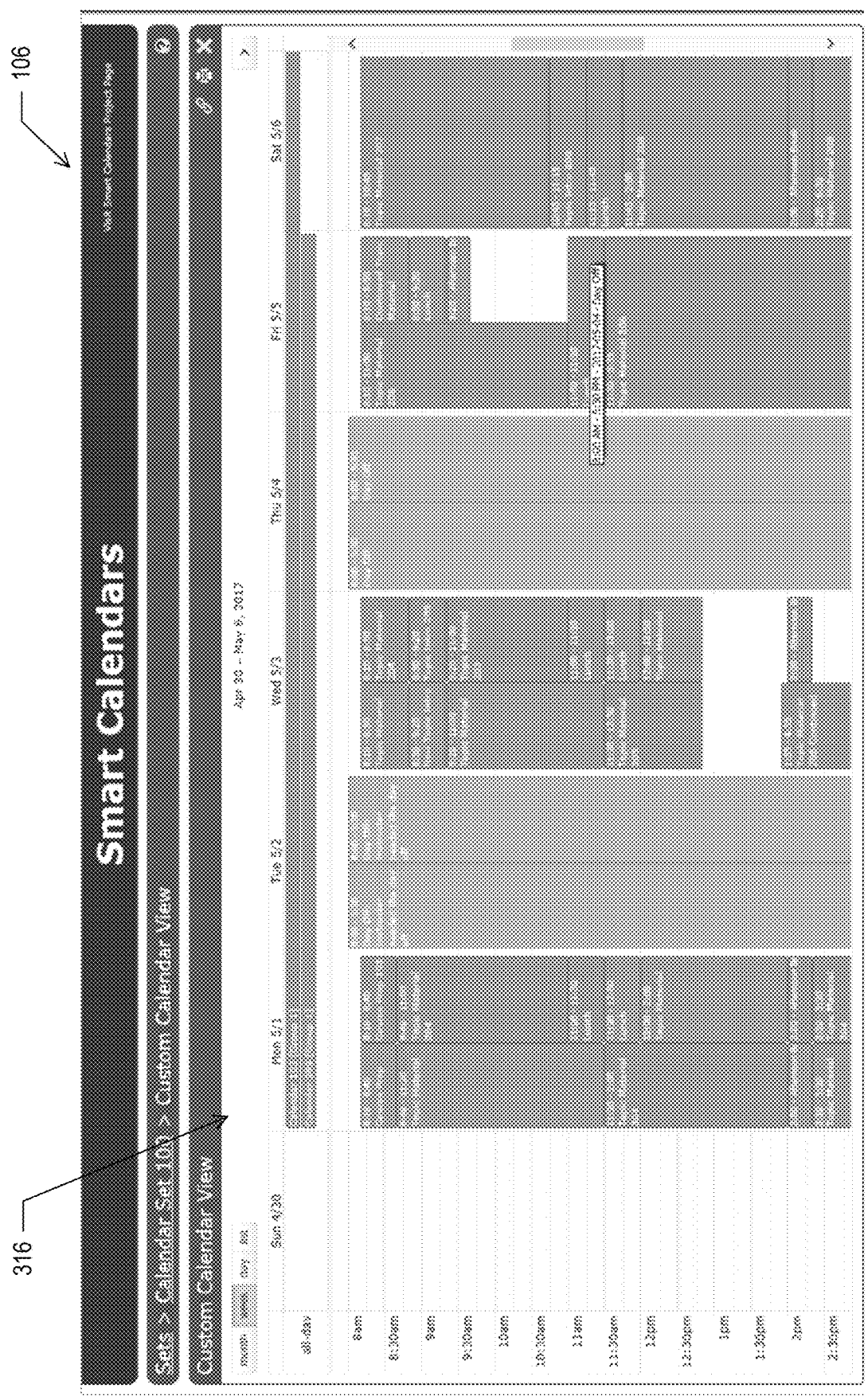

FIG. 3E shows an example 316 of a generated calendar that is published to one or more users. As described above, a calendar may be viewed by individuals who are in the group(s) that are associated with the calendar (e.g., authorized to view the calendar). As described above, the calendar may automatically, dynamically update in response to changes in events, availability, and so forth. As shown in the example, mousing over (and/or selecting) a scheduled event in a calendar may cause the screen to present details regarding the event.

Figure 4A:
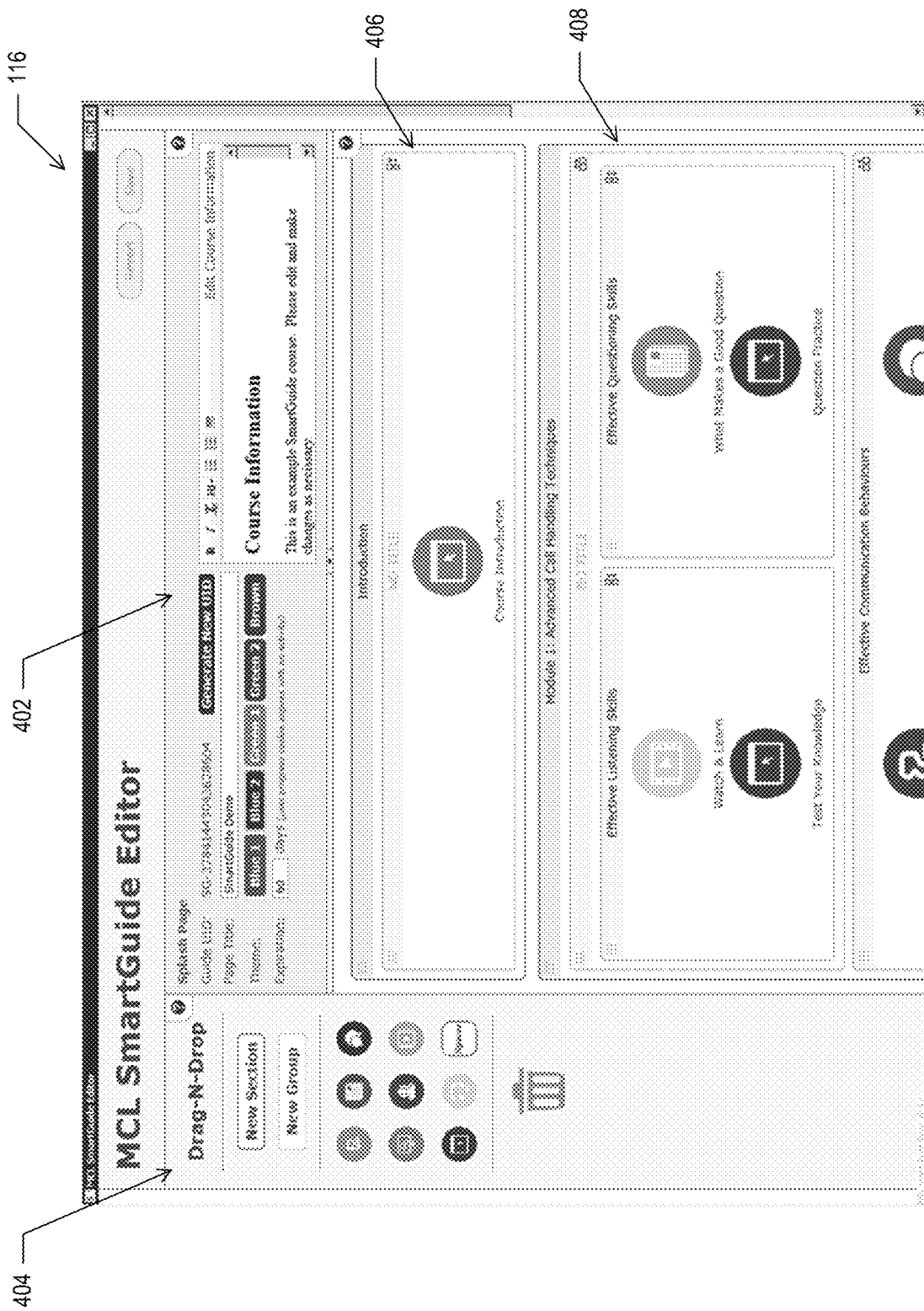
FIGS. 4A-4D depict example user interface screens for the guide application, according to implementations of the present disclosure.
Figure 4B:
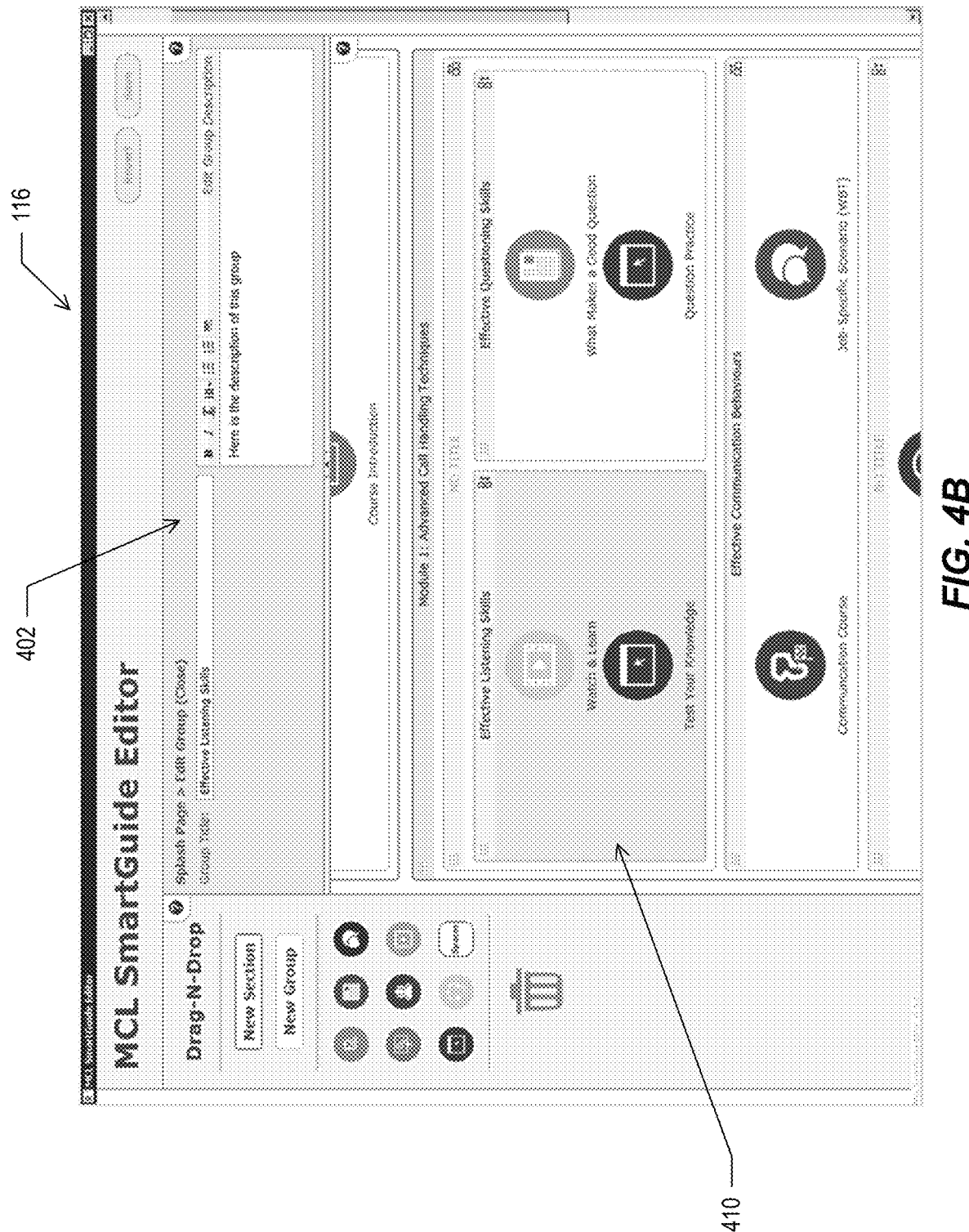
Figure 4C:
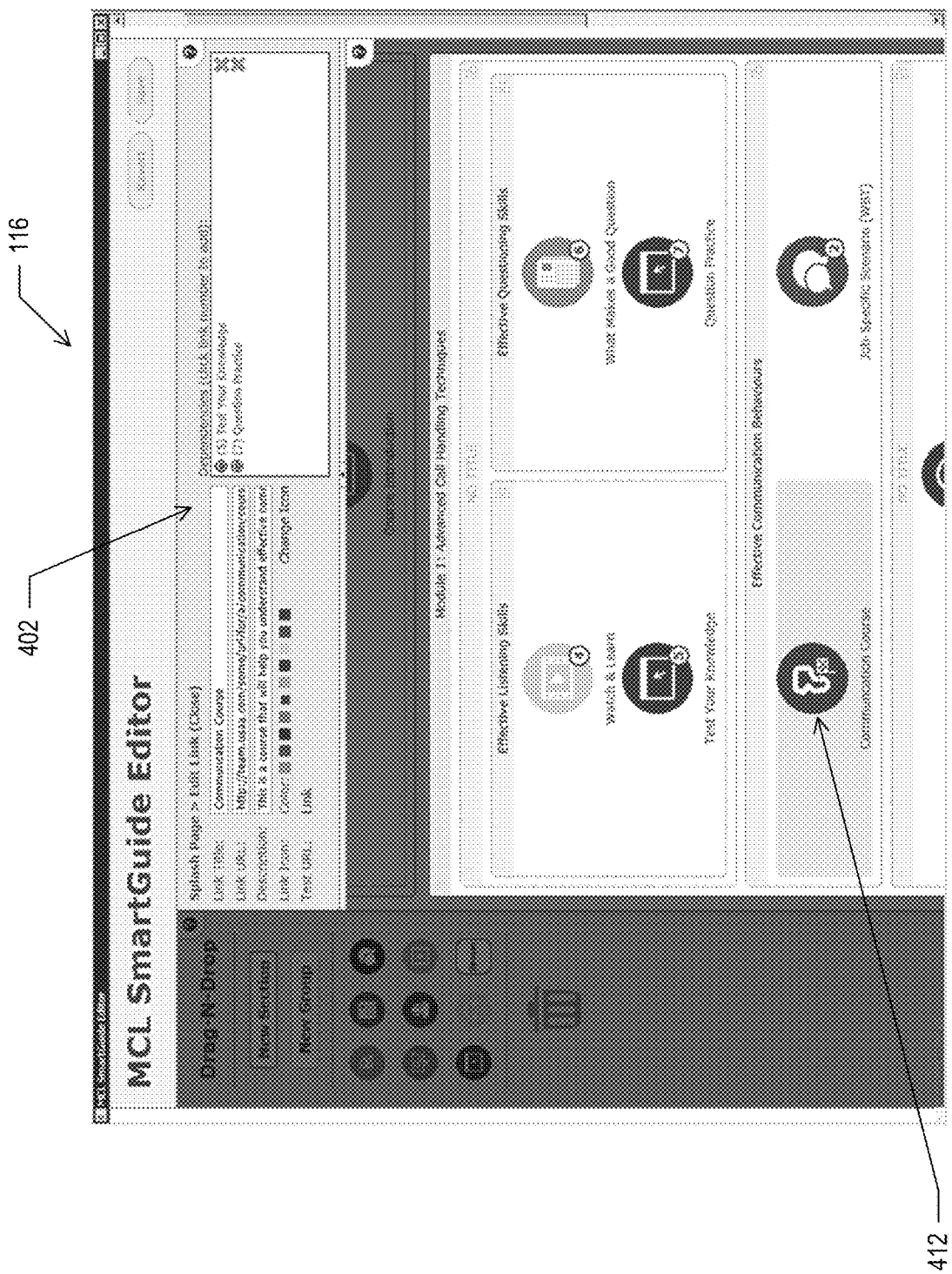

FIGS. 4A-4D depict example user interface screens for the guide application 116, according to implementations of the present disclosure. FIGS. 4A-4C show examples of the editor used to specify and/or view guide information. FIG. 4A shows an example screen that is a top-level screen for the editor. The screen includes a pane 402 that, in this context, shows general information regarding the course associated with the guide being designed. The editor includes a pane 404 that provides various icons for types of activities that may be added to the guide, such as audio activities, video activities, text-based reading assignments, interactive tests, and so forth. The user (e.g., designer of the guide) may drag and drop the icons into the panes 406 or 408 to add activities to sections of the guide. The pane 404 may also allow the user to add new section(s) and/or new sub-sections (e.g., shown as a "New Group" in this example). A pane 406 may indicate a section that is an introductory section for the guide, and one or more panes 408 may indicate sections and/or sub-sections of the guide, including various activities. For example, the guide that is being edited in this example includes an "Introduction" section with a single activity "Course Introduction." The guide also includes a "Module 1" section with an untitled sub-section that itself includes sub-sections titled "Effective Learning Skills," "Effective Questioning Skills," and "Effective Communications Behaviors." Each sub-section includes activities, such as "Watch & Learn," "Test Your Knowledge," and so forth. The trash can icon can be used to delete activities.

The pane 402 can change based on context. For example, in FIG. 4B the user has selected a sub-section 410 to view and/or edit, and the pane 402 is showing information regarding the selected sub-section. As another example, in FIG. 4C the user has selected a particular activity 412 in a sub-section, and the pane 402 is showing information regarding the selected activity. The pane 402 can be used to edit details regarding an activity, such as the link to the content associated with the activity (e.g., text to read, a quiz to take, a video to watch, etc.).

Figure 4D:
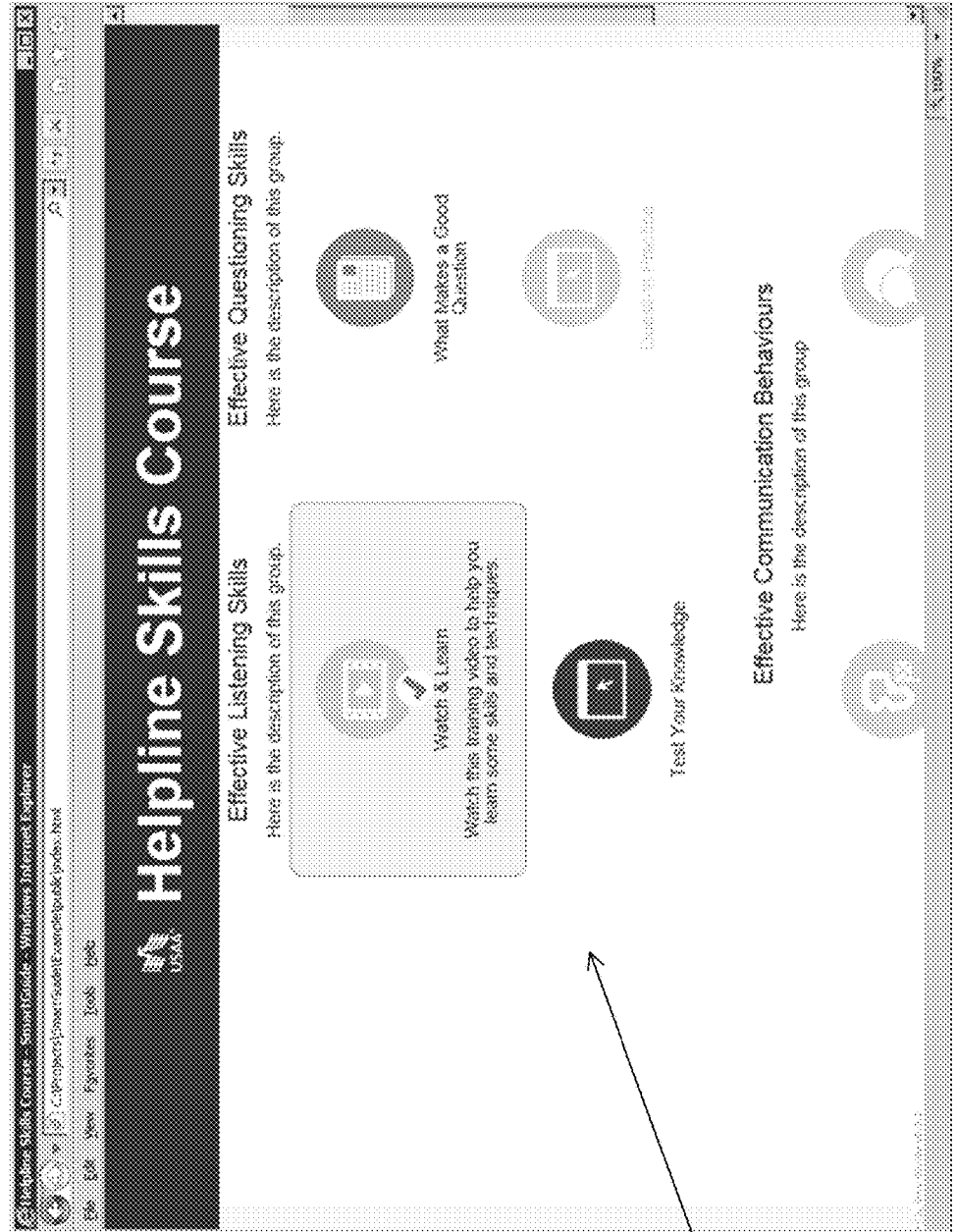

FIG. 4D shows an example of a published guide 414 that an end-user may use to navigate through a course of activities listed in the guide, as described above. The guide may keep track of the user's progress, and indicate incomplete and complete activities. The layout of activities, sections, and sub-sections in the published guide mirrors the layout in the editor. Accordingly, the editor may be used to alter the layout, e.g., by dragging and dropping activities, sections, and/or sub-sections to have a different arrangement.

Figure 5A:
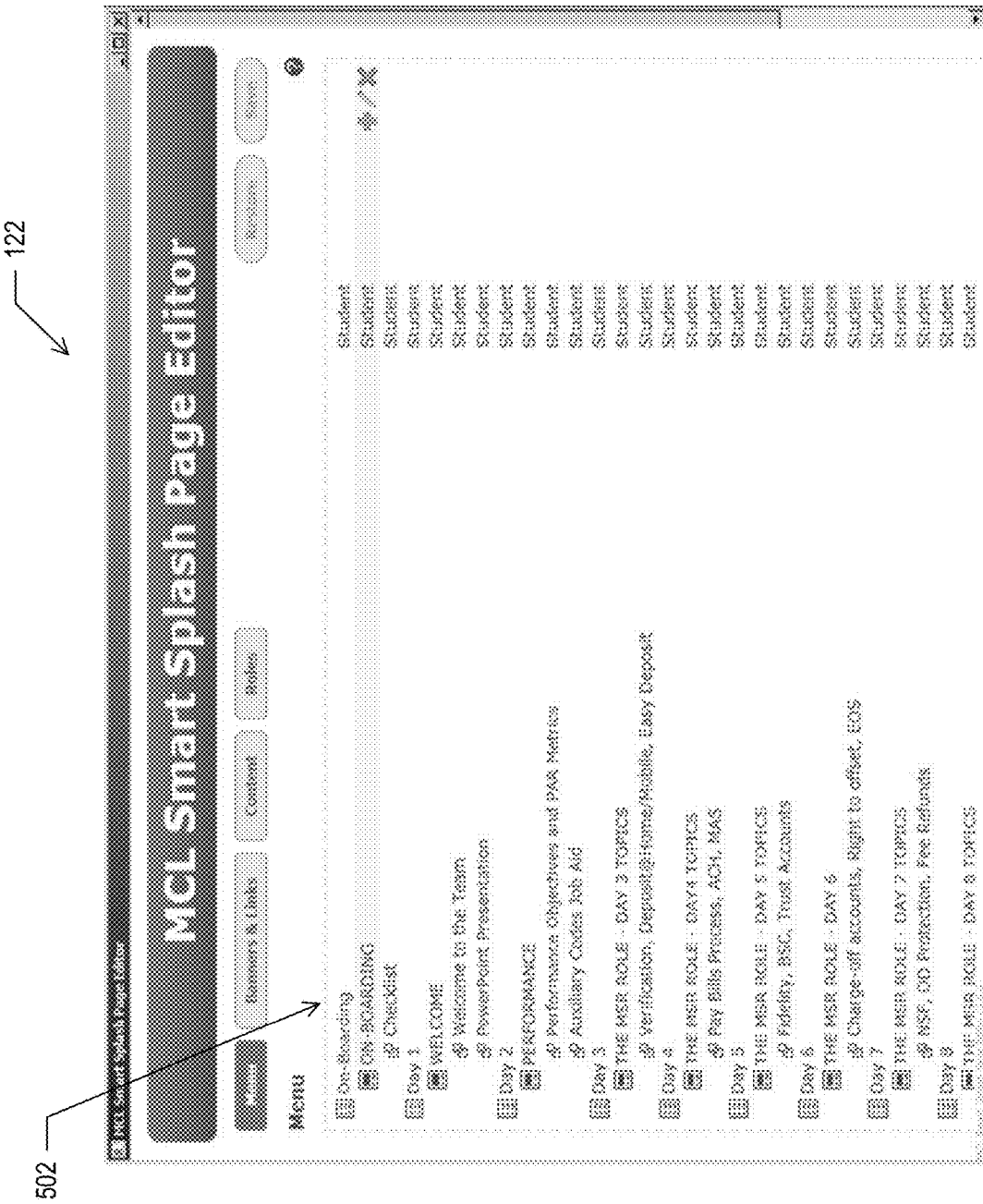
FIGS. 5A-5E depict example user interface screens for the splash page application, according to implementations of the present disclosure.

FIGS. 5A-5E depict example user interface screens for the splash page application 122, according to implementations of the present disclosure. FIGS. 5A-5D show examples of the editor used to specify and/or view splash page information. FIG. 5A shows an example screen used to specify information for a menu, such as a menu to be presented on a (e.g., left) side of the splash page. The pane 502 can be used to view and/or edit menu items to be included in the menu. The pane 502 may also include the role(s) (e.g., "Student") of end-users who are permitted to view and/or navigate each menu item.

Figure 5B:
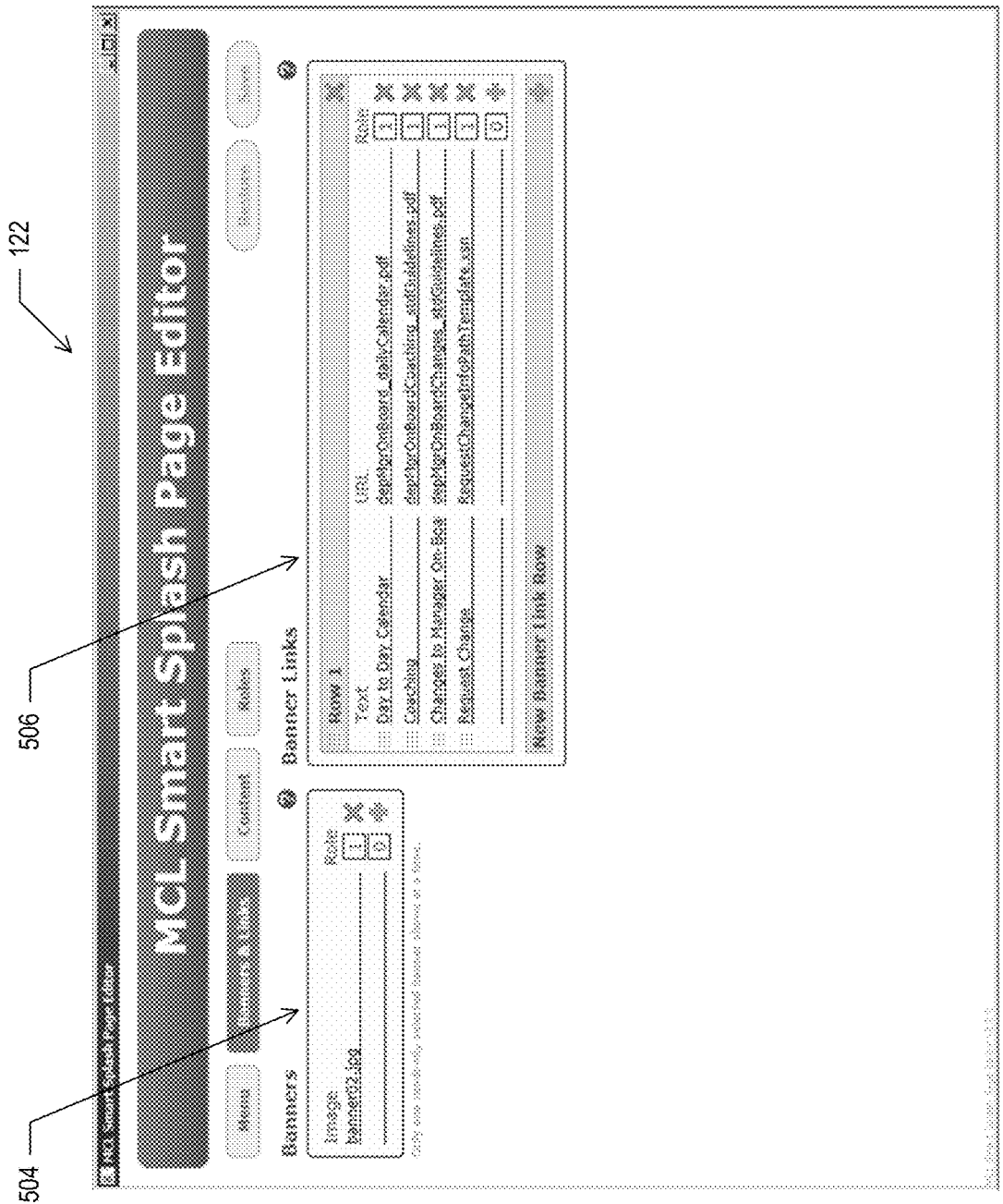

FIG. 5B shows an example screen used to specify information for banners and banner links. A banner may be presented at the top, bottom, or elsewhere on the splash page, and may include one or more links that a user may navigate to view information. A pane 504 is used to select a banner to be edited, add a banner, or delete a banner. The pane 504 can also be used to indicate the role(s) of users who will be shown the selected banner. A pane 506 may show the various banner links that have been added in pane 504. In some implementations, banner links are independent of, and not associated with, a specific banner image. The pane 506 can be used to edit banner items (e.g., change text or URL for a banner item), add a banner item, remove a banner item, or specify role(s) of users who will be shown the banner item(s).

Figure 5C:

FIG. 5C shows an example screen used to specify other content to be shown within the splash page. A pane 508 may be used to add, remove, or edit sections of content. Within each section, different types of content may be listed such as headings, paragraphs, lists, and so forth. The pane 508 may also be used to add, remove, or edit particular content items within each section.

Figure 5D:
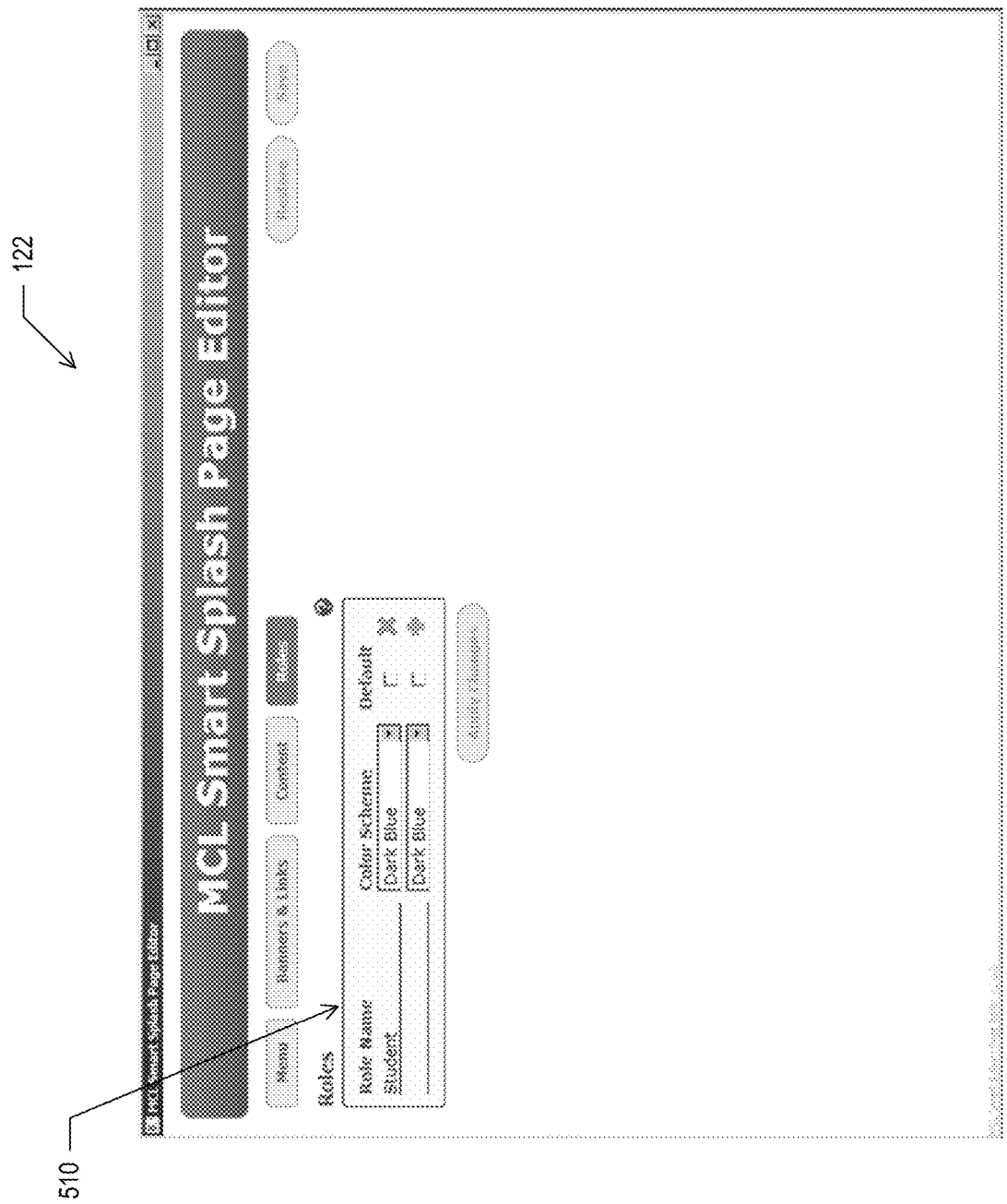

FIG. 5D shows an example screen used to specify role(s) for the splash page. A pane 510 may enable the user to add, or remove a role, and/or edit attributes of a role such as the role name, color scheme or theme associated with the role, and so forth. The splash page that is presented to a particular end-user may be presented in the color scheme and/or theme associated with the end-user's role.

Figure 5E:
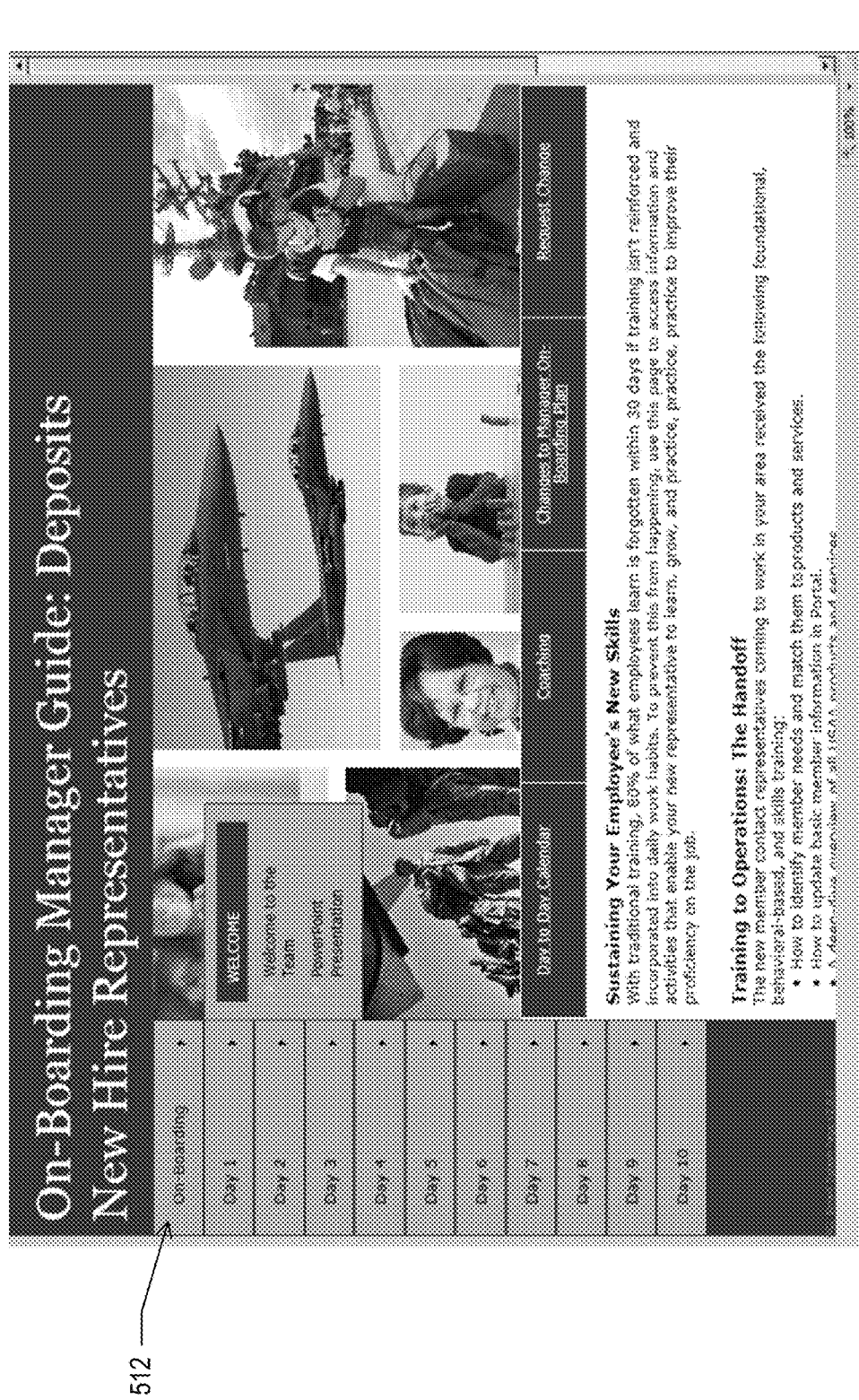

FIG. 5E shows an example splash page 512 that is presented to an end-user, including the menu items, banner items, and/or other content specified using the editor. The splash page is presented with a color scheme and/or theme according to the viewer's role, and the particular menu items, banner items, and/or content that is presented may depend on the role as well.

Figure 6:
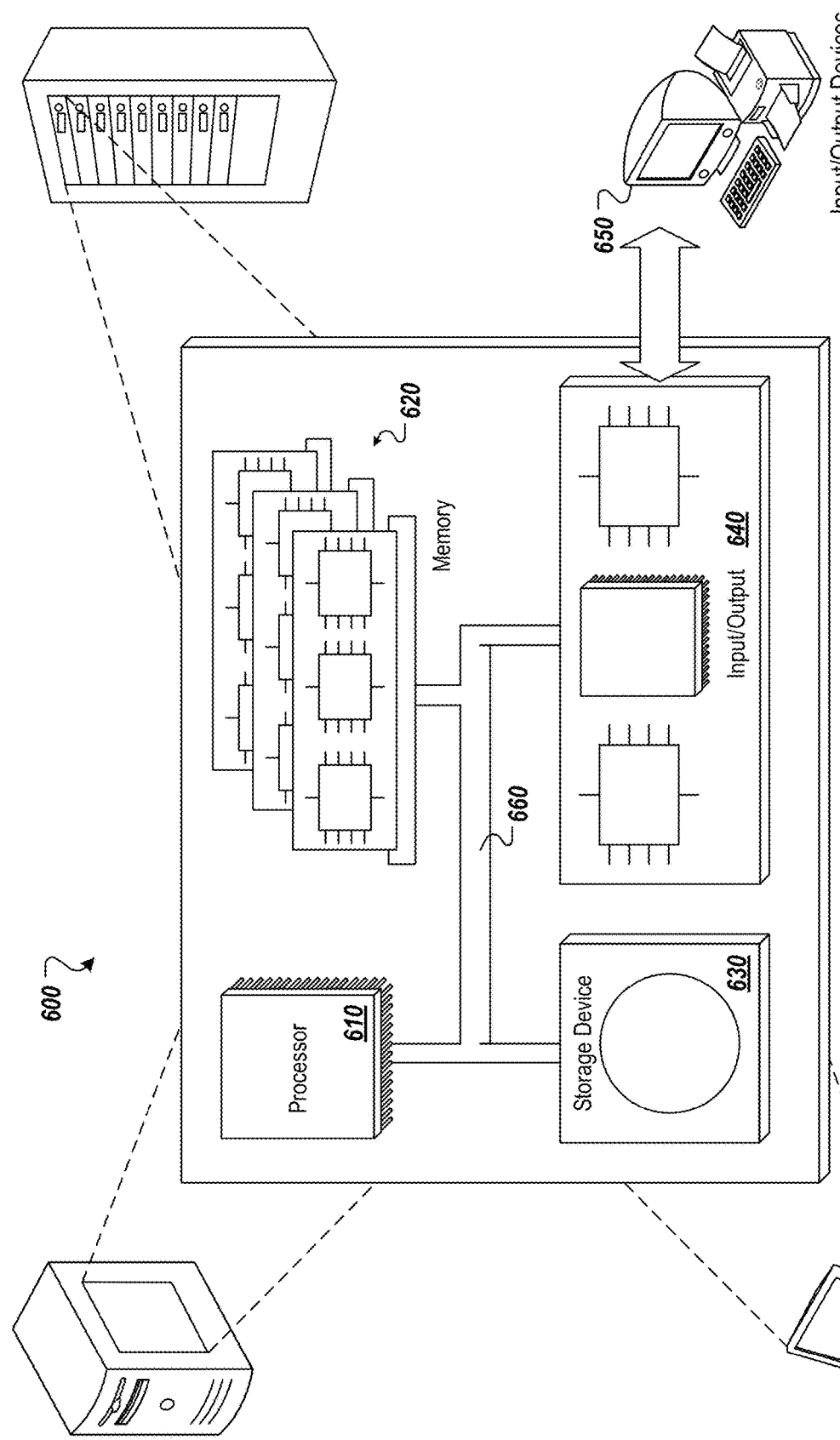
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more components of the system 100, such as the user device 102, the server device(s) 104, and/or other computing device(s) or computing system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method performed by at least one processor, the method comprising:
   receiving, by the at least one processor, event information describing events and a respective duration of each of the events, each of the events having a respective group of attendants;
   receiving, by the at least one processor, availability information indicating available time periods for scheduling the events;
   generating, by the at least one processor, a calendar by scheduling each of the events in at least one respective available time period, comprising:
      determining that a duration of at least one of the events exceeds a threshold duration, and
      in response to a determination that the duration of the at least one event exceeds the threshold duration, automatically splitting the at least one event across multiple available time periods such that the schedule of the events completes in the shortest amount of time relative to the time when the first event occurs;
   providing, by the at least one processor, the calendar for presentation through a user interface (UI);
   receiving, by the at least one processor, an indication of a change in at least one of the scheduled events, and in response, automatically re-generating the calendar according to the change by rescheduling at least one of the events; and
   imposing viewing permissions on the re-generated calendar, through the UI, such that each of the events on the re-generated calendar is viewable by only attendants in the respective group of attendants who are participating in the event.

2. The method of claim 1, wherein:
   the at least one of the events has a duration that is longer than one of the available time periods; and
   the at least one of the events is divided for scheduling in the multiple available time periods.

3. The method of claim 1, wherein the availability information further indicates at least one time period that is unavailable for scheduling the events.

4. The method of claim 1, wherein generating, by the at least one processor, the calendar by scheduling each of the events in at least one respective available time period comprises: scheduling an event in a single available time period based on the duration of the event being less than the threshold duration.

5. The method of claim 1, wherein the at least one of the events is scheduled into the multiple available time periods that are at a same time on multiple days.

6. The method of claim 1, wherein the change includes one or more of:
   an addition of at least one event;
   a deletion of at least one event;
   an unavailability of at least one time period for at least one event; and
   a change in the duration of at least one event.

7. A system comprising:
   at least one processor; and
   a memory communicatively coupled to the processor, the memory storing instructions which, when executed by the at least one processor, cause the at least one processor to perform operations comprising:
      receiving event information describing events and a respective duration of each of the events, each of the events having a respective group of attendants;
      receiving availability information indicating available time periods for scheduling the events;
      generating a calendar by scheduling each of the events in at least one respective available time period, comprising:
         determining that a duration of at least one of the events exceeds a threshold duration, and
         in response to a determination that the duration of the at least one event exceeds the threshold duration, automatically splitting the at least one event across multiple available time periods such that the schedule of the events completes in the shortest amount of time relative to the time when the first event occurs;
      providing the calendar for presentation through a user interface (UI);
      receiving an indication of a change in at least one of the scheduled events, and in response, automatically re-generating the calendar according to the change by rescheduling at least one of the events; and
      imposing viewing permissions on the re-generated calendar, through the UI, such that each of the events on the re-generated calendar is viewable by only attendants in the respective group of attendants who are participating in the event.

8. The system of claim 7, wherein:
   the at least one of the events has a duration that is longer than one of the available time periods; and the at least one of the events is divided for scheduling in the multiple available time periods.

9. The system of claim 7, wherein the availability information further indicates at least one time period that is unavailable for scheduling the events.

10. The system of claim 7, wherein generating the calendar by scheduling each of the events in at least one respective available time period comprises: scheduling an event in a single available time period based on the duration of the event being less than the threshold duration.

11. The system of claim 7, wherein the at least one of the events is scheduled into multiple available time periods that are at a same time on multiple days.

12. The system of claim 7, wherein the change includes one or more of:
   an addition of at least one event;
   a deletion of at least one event;
   an unavailability of at least one time period for at least one event; and
   a change in the duration of at least one event.

13. One or more computer-readable storage media storing instructions which, when executed by at least one processor, cause the at least one processor to perform operations comprising:
   receiving event information describing events and a respective duration of each of the events;
   receiving availability information indicating available time periods for scheduling the events;
   generating a calendar by scheduling each of the events in at least one respective available time period, comprising:
      determining that a duration of at least one of the events exceeds a threshold duration, and
      in response to a determination that the duration of the at least one event exceeds the threshold duration, automatically splitting the at least one event across multiple available time periods such that the schedule of the events completes in the shortest amount of time relative to the time when the first event occurs;
   providing the calendar for presentation through a user interface (UI);
   receiving an indication of a change in at least one of the scheduled events, and in response, automatically re-generating the calendar according to the change by rescheduling at least one of the events; and
   imposing viewing permissions on the re-generated calendar, through the UI, such that each of the events on the re-generated calendar is viewable by only attendants in the respective group of attendants who are participating in the event.

14. The one or more computer-readable storage media of claim 13, wherein:
   the at least one of the events has a duration that is longer than one of the available time periods; and
   the at least one of the events is divided for scheduling in multiple available time periods.

15. The one or more computer-readable storage media of claim 13, wherein the availability information further indicates at least one time period that is unavailable for scheduling the events.

16. The one or more computer-readable storage media of claim 13, wherein generating the calendar by scheduling each of the events in at least one respective available time period comprises: scheduling an event in a single available time period based on the duration of the event being less than the threshold duration.

17. The one or more computer-readable storage media of claim 13, wherein the at least one of the events is scheduled into multiple available time periods that are at a same time on multiple days.

* * * * *